United States Patent [19]

Whitman

[11] 4,287,942
[45] Sep. 8, 1981

[54] HEAT STORAGE APPARATUS
[76] Inventor: William C. Whitman, 3 Fourth St., New Brunswick, N.J. 08901
[21] Appl. No.: 920,962
[22] Filed: Jun. 30, 1978
[51] Int. Cl.³ .................. F28D 13/00; F24M 7/00
[52] U.S. Cl. .......................... 165/104.14; 126/400; 126/430; 165/104.19
[58] Field of Search ............... 126/400, 270, 271, 449, 126/430, 436; 165/104 S

[56] References Cited
U.S. PATENT DOCUMENTS

| | | | |
|---|---|---|---|
| 2,677,367 | 5/1954 | Telkes | 126/400 |
| 3,103,934 | 9/1963 | Sabourin | 126/400 |
| 4,122,828 | 10/1978 | Diperi | 126/400 |
| 4,124,018 | 11/1978 | Murray | 126/400 |
| 4,128,095 | 12/1978 | Oren | 126/449 |
| 4,175,938 | 11/1979 | Regehr | 55/440 |

FOREIGN PATENT DOCUMENTS 52-16839  2/1977  Japan .............................. 175/104 S

OTHER PUBLICATIONS

Univ. of Delaware, Institute of Energy Conservation Circular, Summer 1977.

Primary Examiner—Samuel Scott

[57] ABSTRACT

The invention disclosed is of a housing which includes a plurality of assemblies which carry chemical substances which can absorb and store heat. The assemblies comprise sheets of synthetic resinous material which are sealed together along parallel lines to form pockets or chambers in which the chemical substances are carried. The filled sheets are hung, with the tubes horizontal, in an insulated box. The assemblies are placed close to each other so that the horizontal pockets of adjacent assemblies do not abut each other, but are disposed between each other. This provides optimum air flow along the assemblies to provide maximum heat absorption and optimum turbulence.

6 Claims, 5 Drawing Figures

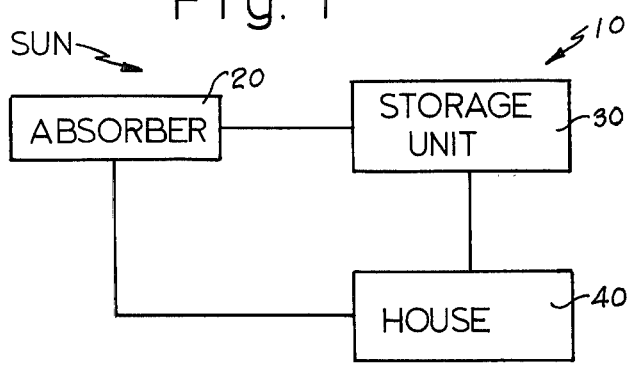
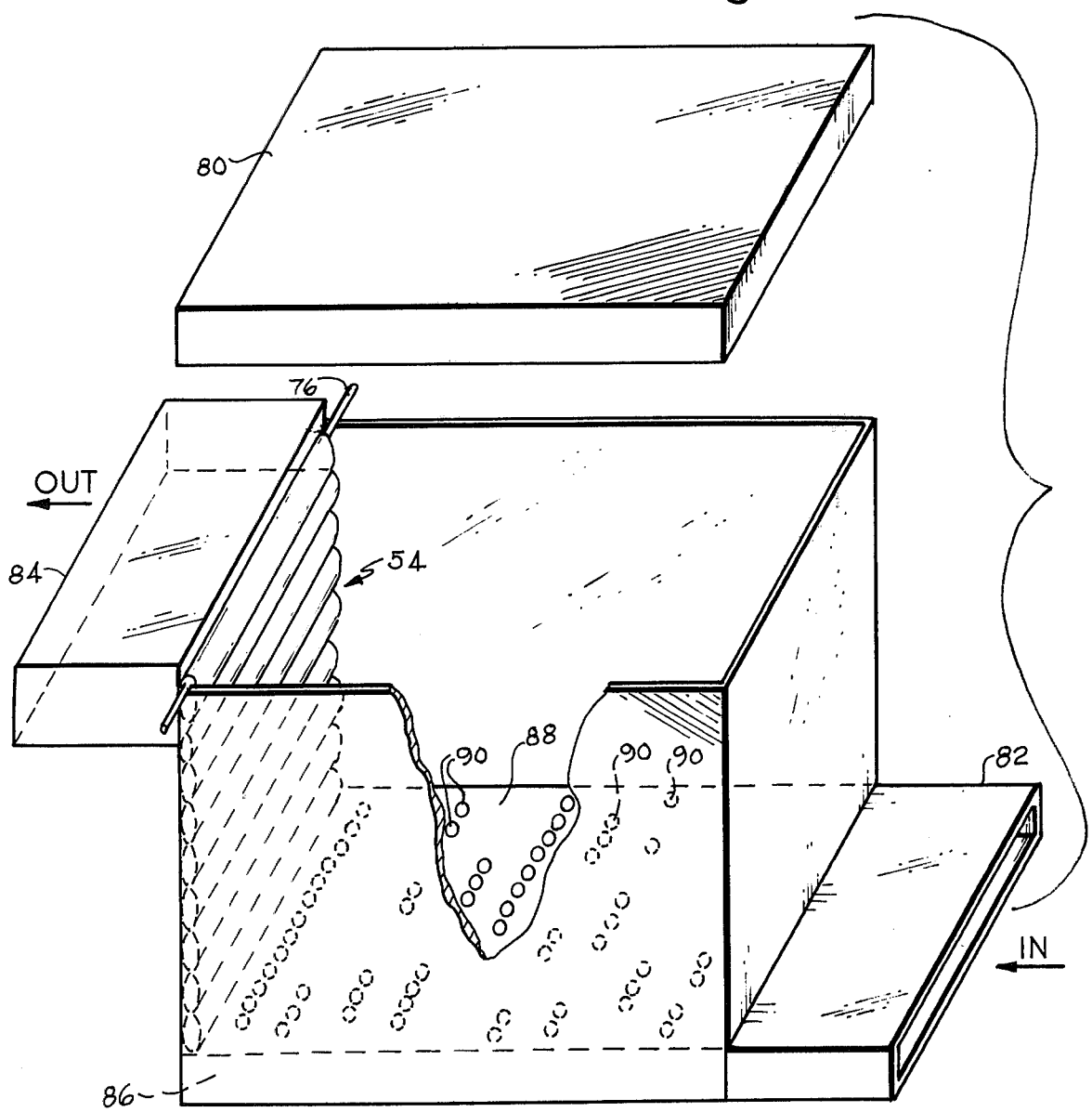

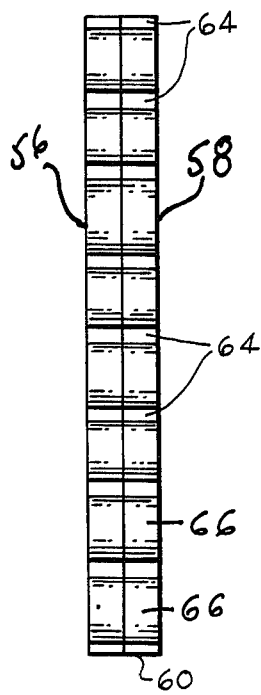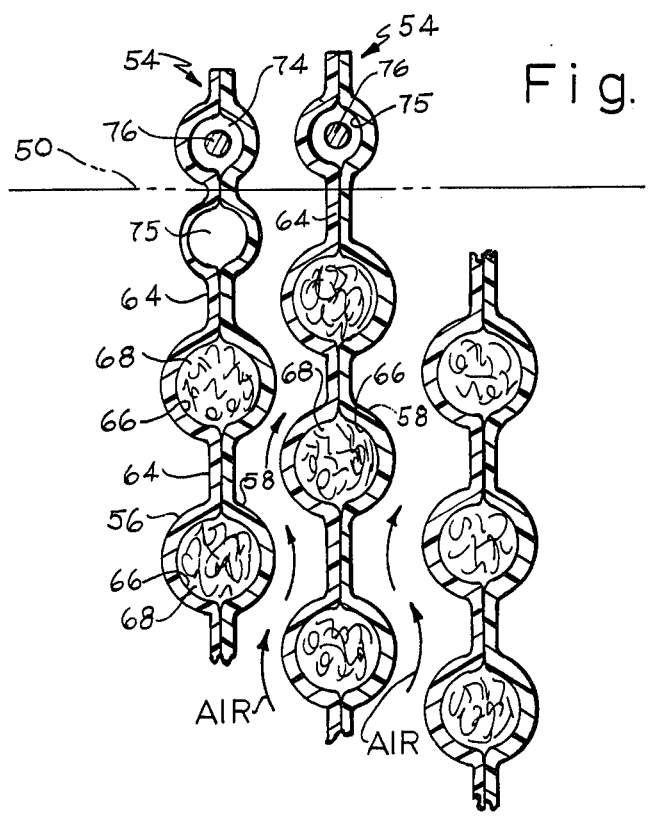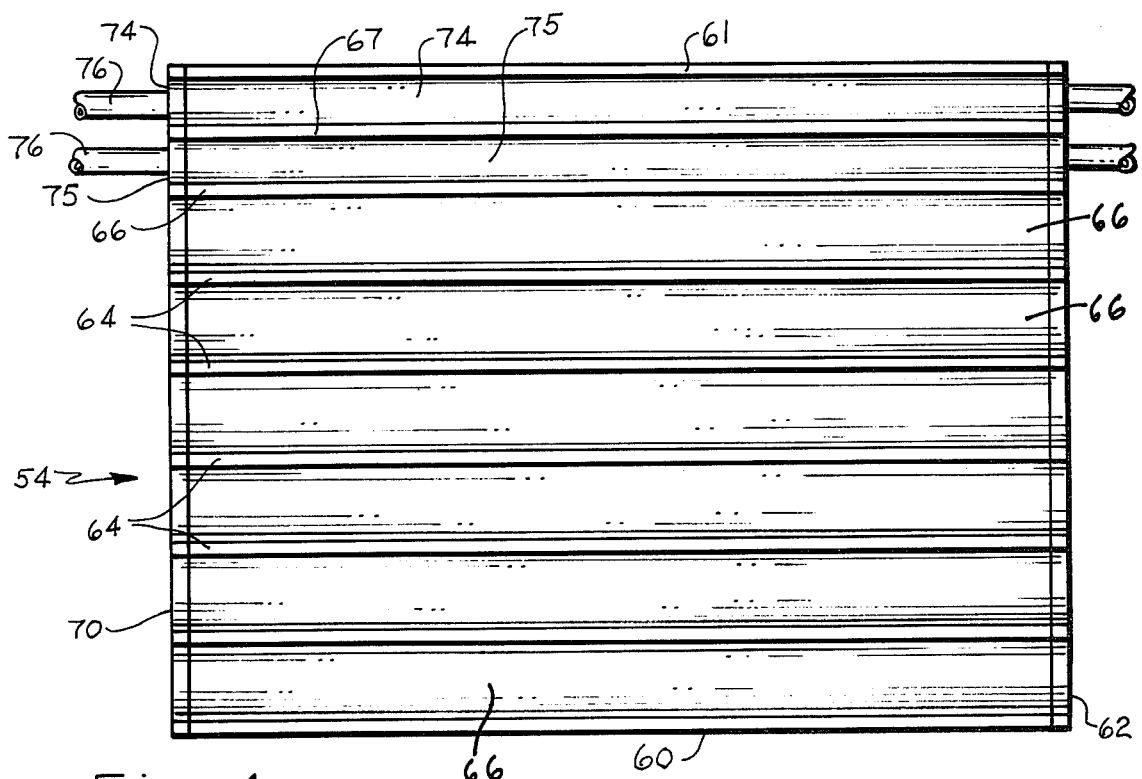

HEAT STORAGE APPARATUS

BACKGROUND OF THE INVENTION

There is considerable activity in the field of solar energy at the present time, and one portion of the typical system, the storage unit, as presently known, is too bulky and expensive. The present invention provides a system and method of manufacture which are relatively simple, inexpensive, and provide a storage unit which occupies minimal space.

DESCRIPTION OF THE DRAWINGS

FIG. 1 is a schematic representation of a solar heating system embodying the invention;

FIG. 2 is a perspective, exploded view of the storage unit of FIG. 1;

FIG. 3 is a side elevational view, considerably enlarged, showing two sheets of film secured together to make up a storage assembly, before being filled with chemicals;

FIG. 4 is a front elevational view of a storage assembly ready for mounting in the storage unit; and FIG. 5 is a side view of several storage assemblies, shown in section, generally as they would be arrayed in the storage unit and illustrating air flow along the assemblies.

DESCRIPTION OF THE PREFERRED EMBODIMENTS

A typical solar energy heating system 10, shown in FIG. 1, includes a solar energy absorber 20 which absorbs heat from the sun and transmits it through a suitable medium such as water or air to a storage unit 30 where the heat is stored until needed, at which time it is circulated through the area to be heated, such as a home 40, and then it is recirculated through the absorber 20.

The storage unit 30, according to the invention and referring to FIGS. 2, 3, 4, and 5, includes a housing or chamber 50 of any suitable size having side walls, a base, and an open top which is closed by a cover 80. A plurality of storage assemblies 54 which are used as chemical carriers are placed in the housing. Each assembly 54 is made up of two sheets 56 and 58 of a suitable non-porous, synthetic resinous material such as polypropylene or the like.

In making the carriers 54, the two sheets 56 and 58, of the same size and shape, are placed together and sealed along the abutting three sides 60, 61, 62 to form a closed container open only at filling edge 70. The two sheets are also sealed together along parallel lines 64, suitably spaced apart, which extend parallel to the sealed side edges 60 and 61 to thereby form elongated chambers or pockets 66 between the sheets 56 and 58 and between the seal lines 64. Two spaced-apart parallel chambers or pockets 74 and 75 are also formed by seal line 67 between edge 61 (the top edge) and the first chamber 66 to receive mounting rods 76. The chambers 66 are filled with a chemical 68, a thermal energy storage chemical such as a salt-hydrate or a eutectic mixture, and then they are sealed along the filling edge 70 to form the sealed chemical carriers or assemblies 54.

It is noted that the pockets 74 and 75 form undulations, arcuate portions, or corrugations in the outer surfaces of the storage assemblies 54.

In use, the carriers 54 are oriented with the chemical-filled chambers horizontal and with the chambers 74 and 75 at the top, and the assemblies are stacked together in the housing 50, with the rods 76 supported in holes in the housing walls or simply set on top of the framing of the housing, as illustrated schematically in FIG. 6.

Preferably, the carriers 54 are arranged in the housing 50 so that the chemical-containing pockets 66 of adjacent carriers are not in contact with or adjacent to each other, but are offset from each other so that, as to adjacent carriers, as seen in FIG. 5, the pockets of one are adjacent to or aligned with the spaces between the pockets of the other. This can be achieved by inserting the rods 76, of adjacent carriers, first in rod chamber 74 and then in rod chamber 75 and then in chamber 74, etc.

The housing 50 is provided with a cover 80 and with suitable inlet and outlet ducts 82 and 84. The inlet duct 82 may be provided along one side of the housing 50 adjacent to the bottom, and the outlet duct 84 may be provided along the opposite side of the housing adjacent to the top of the housing. The inlet duct extends from the solar heat absorber 20, and the outlet duct runs to the area 40 to be heated.

In addition, an air distribution plate 86 is coupled to the inlet duct and is disposed adjacent to the base of the housing 50. The air distribution plate is closed except for a top plate 88 having an array of apertures 90, through which the inlet air is distributed upwardly between the carriers 54.

In operation of the invention as illustrated schematically in FIG. 5, air flows upwardly between the carriers 54 and the positioning of the chambers 66, as shown and described, provides a serpentine air flow path which creates an optimum degree of turbulence, and prevents the formation of static layers of air between the chambers.

It is noted that the spacing between storage chambers 66 in each storage assembly 54 may be suitably adjusted for each installation.

What is claimed is:

1. Storage apparatus for thermal energy comprising
   a housing,
   inlet and outlet means in said housing directing a flow of fluid, for use in performing a heat transfer operation, along a path through said housing,
   a plurality of thermal storage assemblies disposed in a series adjacent to each other and generally parallel to each other and positioned so that fluid flows from said inlet means to said outlet means between and along said storage assemblies, said storage assemblies being adapted to take part in a transfer of thermal energy with said fluid,
   each storage assembly comprising a sheet-like member formed with a plurality of parallel, elongated, generally tubular pockets containing a chemical substance which can store and give up thermal energy, said pockets forming a plurality of parallel curved corrugations spaced apart along the length of and in the outer surfaces of said sheet-like member, said pockets being disposed generally transverse to said path of fluid flow through said housing,
   said storage assemblies being positioned, with respect to each other, so that the pockets of one sheet-like member are aligned generally with the space in the adjacent sheet-like member which is present between the pockets thereof so that a serpentine path is formed by the tubular pockets of one member and the spaces between the pockets of the adjacent member, said pockets and spaces causing said fluid to flow along said serpentine path between said sheet-like members, the tubular pockets of one member directing the fluid into the spaces between the tubular pockets of the adjacent member, so that static layers of fluid cannot form along said sheet-like members and cannot reduce the efficiency of the heat transfer process between the fluid and the material in said pockets, said fluid flowing continually in the same direction along said serpentine path from said inlet means to said outlet means and thus facilitating said heat transfer process.

2. The apparatus defined in claim 1 wherein said chemical substance comprises chemical salts which have the ability to absorb heat and to give up heat.

3. The apparatus defined in claim 1 wherein each sheet-like member comprises two layers of plastic film sealed together to form said pockets.

4. The apparatus defined in claim 1 wherein each storage assembly includes a horizontal pocket disposed along its upper margin for receiving a mounting support rod.

5. The apparatus defined in claim 1 and including an air inlet duct and an air outlet duct secured to said housing.

6. The apparatus defined in claim 5 and including an air distribution plate disposed in the base of said housing and coupled to said air inlet duct and disposed to direct air upwardly between said storage assemblies.

* * * * *